Aug. 19, 1969

M. R. CINES 3,462,582

PARISON HEATING

Filed Feb. 7, 1967

INVENTOR.
M. R. CINES
BY *Young & Quigg*

ATTORNEYS

Aug. 19, 1969 M. R. CINES 3,462,582
PARISON HEATING

Filed Feb. 7, 1967 2 Sheets-Sheet 2

INVENTOR.
M. R. CINES
BY Young & Quigg
ATTORNEYS ent Office 3,462,582
Patented Aug. 19, 1969

3,462,582
PARISON HEATING
Martin R. Cines, Bartlesville, Okla., assignor to Phillips
Petroleum Company, a corporation of Delaware
Filed Feb. 7, 1967, Ser. No. 614,440
Int. Cl. F27b 9/14, 9/06, 9/24
U.S. Cl. 219—388                                 8 Claims

ABSTRACT OF THE DISCLOSURE

Tubular thermoplastic parisons rotated under radiant heat while passing through a heating zone wherein the edges of the parison are protected from overheating.

Figure 1:
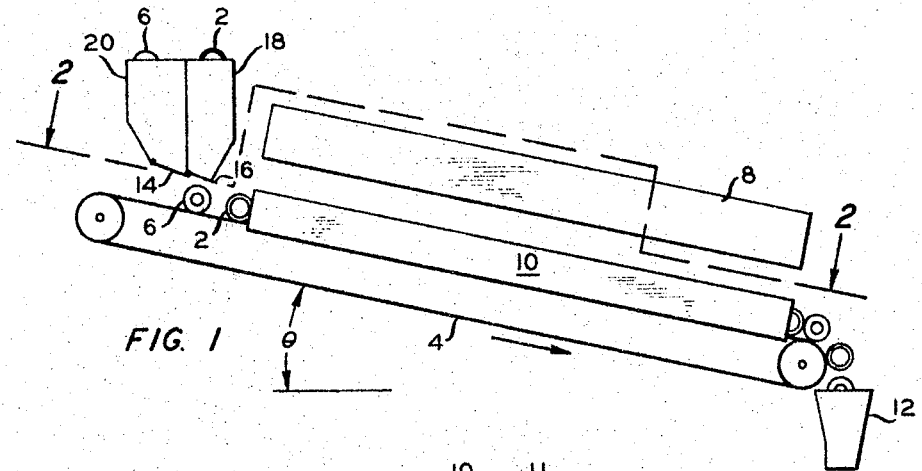

This invention relates to uniformly heating thermoplastic cylindrical articles. In one of its aspects it relates to the controlled heating of thermoplastic cylindrical articles, such as parisons, wherein a plurality of articles are continuously passed through a radiant heating zone and there is provided a means to prevent the overheating of the edges of the articles.

It has been found that when thermoplastic articles are heated to a temperature just below the crystalline melting point of the thermoplastic they have a tendency to stick to metal surfaces and to stick to each other. The crystalline melting point for thermoplastic polymer may be determined either by differential thermal analysis or by an optical method. The optical method consists of observing the polymer through a polarized microscope as it is being heated and taking the temperature at which birefringence disappears as the melting point.

In heating thermoplastic parisons using radiant heat the edges of the parison become heated to the proper temperature before the central portions of the parison. Thus, in order to rise the temperature of the entire parison to the desired temperature, the edges of the parison become overheated. This overheating of the edges often results in deleterious properties for the finished article in some areas. Alternately the overheating requires severing the end portions of the parison prior to use. To avoid the overheating of the ends, the parisons have been radiantly heated in an end-to-end relationship. This has been unsatisfactory, however, because of the previously mentioned tendency for the parison to stick to each other at temperatures near but below the crystalline melting point.

I have now discovered that thermoplastic parisons can be uniformly heated under radiant heat by shielding the end portions of the article from at least a portion of the radiant heat while the article is in the heating zone.

By various aspects of this invention one or more of the following or other objects can be obtained.

It is an object of this invention to provide a process and apparatus for heating thermoplastic parisons.

It is a further object of this invention to provide a method and apparatus for heating thermoplastic parisons wherein the sticking together of heated thermoplastic parisons is substantially avoided.

It is a still further object of this invention to provide a process and apparatus for radiantly heating thermoplastic parisons wherein the overheating of the ends of the parison is avoided.

Other aspects, objects and the several advantages of this invention are apparent to one skilled in the art from a study of this disclosure, the drawings, and the appended claims.

According to the invention, thermoplastic parisons are uniformly heated by passing the same through a heating zone wherein they are radiantly heated while they are continuously rotated about a longitudinal axis to prevent overheating of any one portion of the parison, and the end portions of the parisons are shielded from at least a portion of the radiant heating while the parisons are in the heating zone.

The articles are preferably tubular thermoplastic parisons which are selected from the group consisting of polymers and copolymers of ethylene, propylene, butene-1, styrene, vinylchloride and the like. The parisons are heated to a temperature just below the crystalline melting point.

In one embodiment the sticking together of heated articles in the heating zone is prevented by contacting each parison with a coated article.

In another aspect the articles are heated by rolling the same down an inclined plane through the heating zone while contacting the parison with countercurrently moving continuous belts.

In another embodiment, the articles are supported on a plurality of cylindrical cylinders which are coated with a material to which the thermoplastic parisons will not adhere, the cylinders rotating as they carry the parisons through the heating zone.

In still another embodiment, the parisons are supported in semicircular, hollow, half-cylinders facing upwardly, these cylinders being attached to a continuous moving chain, the half-cylinders being so shaped as to accommodate the articles as they pass through the heating zone, each half-cylinder containing a slit in the bottom portion thereof. In this embodiment there is further provided at least one moving belt supporting the parisons within the half-cylinders and passing through the slits in the half-cylinders wherein the belt moves relative to the half-cylinders so as to rotate each parison as it passes through the heating zone.

Figure 3:
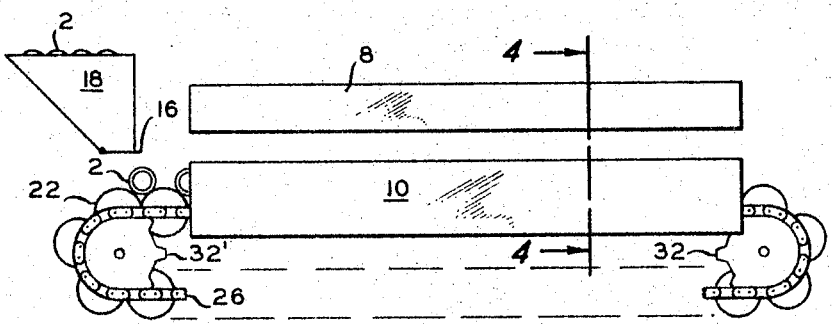
Figure 4:
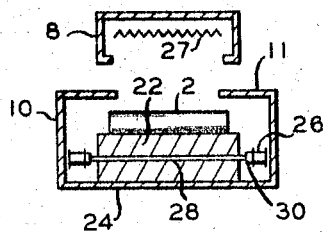
Figure 5:
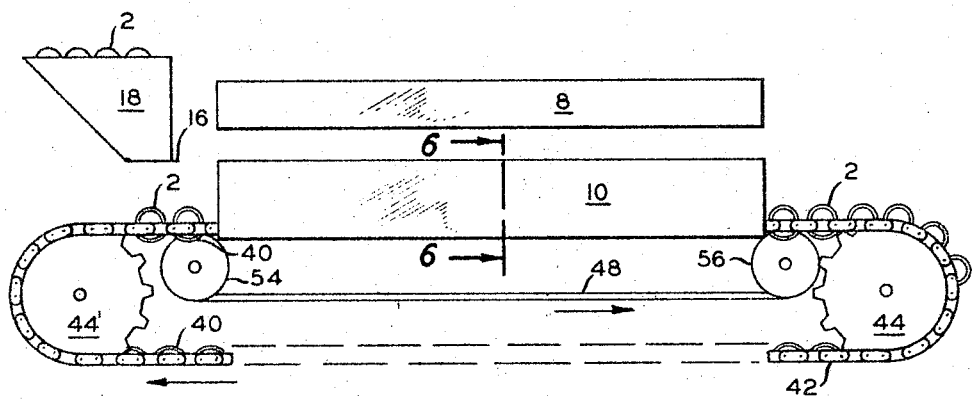
Figure 6:
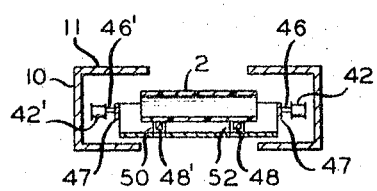

The invention will now be described with reference to the accompanying drawings which illustrate in FIGURES 1 and 2 a first embodiment of the invention, FIGURE 1 being an elevational view and FIGURE 2 being a plan view; FIGURES 3 and 4 which illustrate a second embodiment of the invention, FIGURE 4 being a view along lines 4—4 of FIGURE 3; and FIGURES 5 and 6 illustrating a third embodiment of the invention, FIGURE 6 being a view along lines 6—6 of FIGURE 5.

Figure 2:
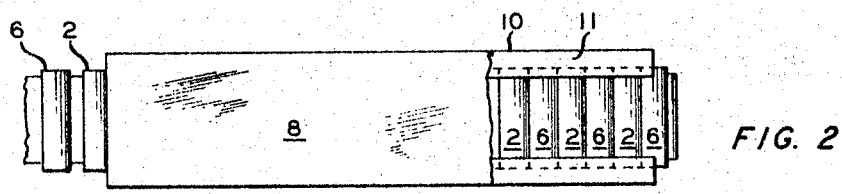

Referring now to the drawings, and in particular to FIGURES 1 and 2, there is provided a continuously moving belt 4, the top half of which moves up an inclined plane which is at an angle $\theta$ with the horizontal. A plurality of parisons 2 is discharged from hopper 18 through trap door 16 one at a time onto the moving belt 4. A plurality of coated cylinders 6 positioned in hopper 20 is discharged through trap door 14 intermittently of the parisons 2 and separate each parison as they pass down the inclined plane. The coated cylinders 6 are coated with a material to which the heated parisons 2 will not adhere. Preferably the coating material is a polymer of a halogenated ethylene, for example, polytetrafluoroethylene. The parisons 2 and coated cylinders 6 move down the inclined plane and are rotated continuously by the upwardly moving belt 4. The rotating parisons 2 and coated cylinders 6 pass through a heating zone or heating chamber defined by a hood 8 which contains radiant heating members. The radiant heating members can comprise electrical resistance elements or heat lamps, or pipes containing heated fluid. Preferably electrical resistance elements are used. Also provided within the heating zone or chamber are protecting plates 10 which have inwardly projecting flanges 11 to protect the ends of the parison from being overheated as they pass through the radiant heating zone. As the parisons roll down the inclined plane, they are heated to a temperature just below the crystalline melt point of the parison material. Flanges 11 protect the end portions of the parisons from being overheated while coated cylinders 6 prevent the parisons at the bottom portion of the heating zone from sticking together. The parisons are collected in an elongated funnel 12 and are conducted immediately to a blow molding operation wherein molding takes place.

The angle of the inclined plane and the speed of the belts is adjusted so that the article, i.e., the parison 2, rolls down the plane at a speed relative to the heating zone such that the article is heated to a temperature just below the crystalline melt point of the polymer of the parison.

Referring now to FIGURES 3 and 4, where like numerals have been used to describe like parts, a plurality of parisons 2 passes from hopper 18 through trap door 16 onto a moving belt defined by a plurality of closely connected cylindrical coated cylinders 22. The cylinders are preferably coated with a material to which the heated thermoplastic parisons will not adhere. The cylinders 22 are spaced so that they can roll as they pass through the heating zone defined by that area between the rollers 22 and closure 8. The coated cylinders 22 are connected to a chain 26 which is driven by sprocket wheel 32 and 32'. Each parison rests between two coated cylinders 22. As the cylinders pass under the element 27, they contact plate 24 which causes the rotation of the cylinders 22. Each cylinder 22 has a rod 28 passing through the central portion thereof and is rotatably connected to chain 26 through fastening means 30. As can be seen from the drawing, flange 11 protects the end portions of parisons 2 from at least a portion of the radiant heat from heating element 27.

Referring now to FIGURES 5 and 6, where like numbers are used to designate like parts, a plurality of parisons 2 passes from hopper 18 through trap door 16 into a plurality of semicircular hollow cylindrical troughs 40. Each trough carries a parison beneath the heating chamber 8 while flanges 11 protect the end portions of the parison 2 from being overheated. Each trough has an end plate 47 which is connected by pins 46 and 46' to a chain drive 42 and 42' respectively. Chains 42 and 42' are actuated to rotate clockwise as shown in FIGURE 5 by supporting wheels 44 and 44'. Each trough contains a slit 52 and 50 at the bottom portion thereof. A pair of belts 48 and 48' pass through slits 52 and 50 respectively and contact the parison as it passes through the heating zone. The belts 48 and 48' move relative to the troughs 40 so as to cause rotation of parison 2 as the parison is moved through the heating zone. Belts 48 and 48' are supported on rollers 56 and 54 and are actuated by these rollers. According to the embodiment shown in FIGURES 5 and 6, the belts 48 and 48' move counterclockwise and in this regard countercurrent to the direction of movement of troughs 40 through the heating zone. It is obvious that the belts 48 and 48' can move cocurrent with the troughs 40 or remain stationary so long as there is relative movement between the belts 48 and 48' and troughs 40 so that the parison 2 will thereby be rotated as it passes beneath the heating hood 8.

Reasonable variation and modification are possible within the scope of the foregoing disclosure, the drawings, and the appended claims to the invention without departing from the spirit thereof.

I claim:

1. A method for uniformly heating a tubular thermoplastic parison comprising passing said parison through a heating zone, radiantly heating said parison in said heating zone, continuously rotating said parison about a longitudinal axis in said heating zone to prevent overheating of any one portion of said parison, shielding the end portions of said parison from at least a portion of said radiant heating while said parison is in said heating zone.

2. A method according to claim 1 wherein said parison is heated to a temperature just below the crystalline melt point of said parison.

3. A method according to claim 1 wherein each parison is placed in rolling contact with a surface to which the parison when heated will not adhere and the surface prevents heated parisons from sticking together as they pass through the heating zone.

4. An apparatus for heating a cylindrical article comprising:
   (a) a heating chamber having a radiant heating element;
   (b) means for passing a cylindrical article through said heating chamber;
   (c) means in said heating chamber to shield the edges of said article from at least a portion of the radiant heat from said radiant heating element as said article passes through said heating chamber to thereby prevent overheating of the edges of said article, said shield means being adjacent to said means of (b) and so disposed that said edges of said article pass under said shield; and
   (d) means for rotating said article as it passes through said heating chamber.

5. An apparatus according to claim 4 wherein there is further provided:
   (e) a means for preventing successive articles from sticking together as they reach the end of said heating chamber.

6. An apparatus according to claim 4 wherein said means of (b) comprises an inclined plane, and said means of (d) comprises a continuous belt which moves up said inclined plane, the angle of said inclined plane and the speed of said belt being adjusted so that said article rolls down said plane at a speed relative to the heating chamber of (a) such that said article is heated to a temperature below the melt point of said article.

7. An apparatus according to claim 4 wherein said means of (b) and (d) comprise an endless chain of cylinders coated with a material to which the heated articles are not adherent, said cylinders continuously rolling through said chamber with each of said articles supported between a pair of said cylinders.

8. An apparatus according to claim 4 wherein said means of (b) comprises a plurality of cylindrical troughs, facing upwardly, attached in a continuous moving chain, said cylindrical troughs being so shaped as to accommodate said article as it passes through said heating chamber of (a), each trough having at least one transverse slit in the bottom portion thereof; said means of (d) comprises at least one continuous belt passing through said slit of each trough and supporting said article, and means to move said belt relative to said means of (d) so as to rotate said article within said trough as said article moves through said heating chamber of (a).

References Cited

UNITED STATES PATENTS 2,303,873 12/1942 Anderson _____ 219—347 X
2,575,426 11/1951 Parnell _____ 219—388 X BERNARD A. GILHEANY, Primary Examiner R. N. ENVALL, JR., Assistant Examiner U.S. Cl. X.R.

34—240; 219—10.43